United States Patent [19]
Fisher et al.

[11] Patent Number: 5,346,057
[45] Date of Patent: Sep. 13, 1994

[54] CONVEYOR BELT FOR TREATMENT OF PARTICULATE SOLID MATERIAL

[75] Inventors: Eugene B. Fisher, Chester; Mark St. John North, Richmond; Warren D. Winterson, Midlothian, all of Va.; Leif E. B. Jaxmar, Vallakra, Sweden; Lennart F. Olsson, Nyhamnslage, Sweden; Nils S. Selander, Angelholm, Sweden

[73] Assignee: Philip Morris Incorporated, New York, N.Y.

[21] Appl. No.: 969,761

[22] Filed: Oct. 30, 1992

[51] Int. Cl.⁵ .............................................. B65G 21/18
[52] U.S. Cl. .................................... 198/778; 198/822; 62/381
[58] Field of Search ................... 198/778, 822; 34/147, 34/207; 62/381; 99/443 C

[56] References Cited

U.S. PATENT DOCUMENTS

| | | | |
|---|---|---|---|
| 1,883,528 | 10/1932 | Buck | 198/822 |
| 2,823,790 | 2/1958 | Sifford et al. | 198/822 |
| 3,938,651 | 2/1976 | Alfred et al. | 198/136 |
| 4,089,666 | 5/1978 | Knight | 62/91 |
| 4,178,946 | 12/1979 | Knight | 131/135 |
| 4,344,524 | 8/1982 | Falck et al. | 34/207 |
| 4,565,282 | 1/1986 | Olsson et al. | 198/778 |
| 4,603,776 | 8/1986 | Olsson | 198/778 |
| 4,875,343 | 10/1989 | Jeppsson | 198/228 |
| 4,899,871 | 2/1990 | Olsson | 198/778 |
| 4,909,381 | 3/1990 | Stohr | 198/822 |
| 4,941,567 | 7/1990 | Olsson | 198/778 |

*Primary Examiner*—Joseph E. Valenza
*Attorney, Agent, or Firm*—Charles E. B. Glenn; James E. Schardt; Kevin B. Osborne

[57] ABSTRACT

An improved endless conveyer belt is provided which can carry minute particles of conveyed product such as are found in packed bed applications, without limiting the ability of the conveyor belt to articulate into a spiraling conveyor stack. The perforations in the foraminous bottom member of the conveyor belt can be dimensioned according to the size of conveyed products. The number and placement of the perforations can be chosen to alter gas flow characteristics of the belt.

22 Claims, 4 Drawing Sheets

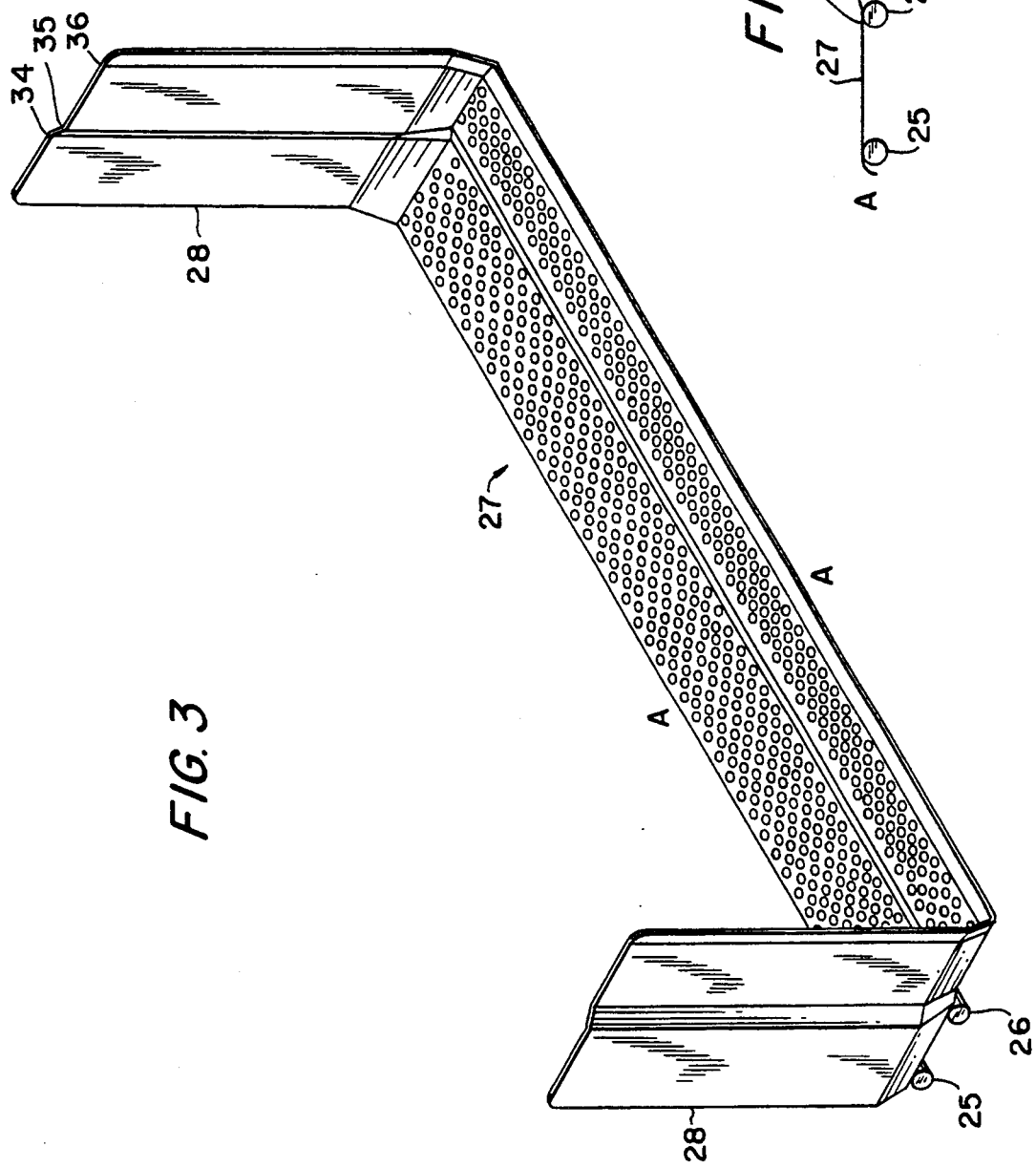

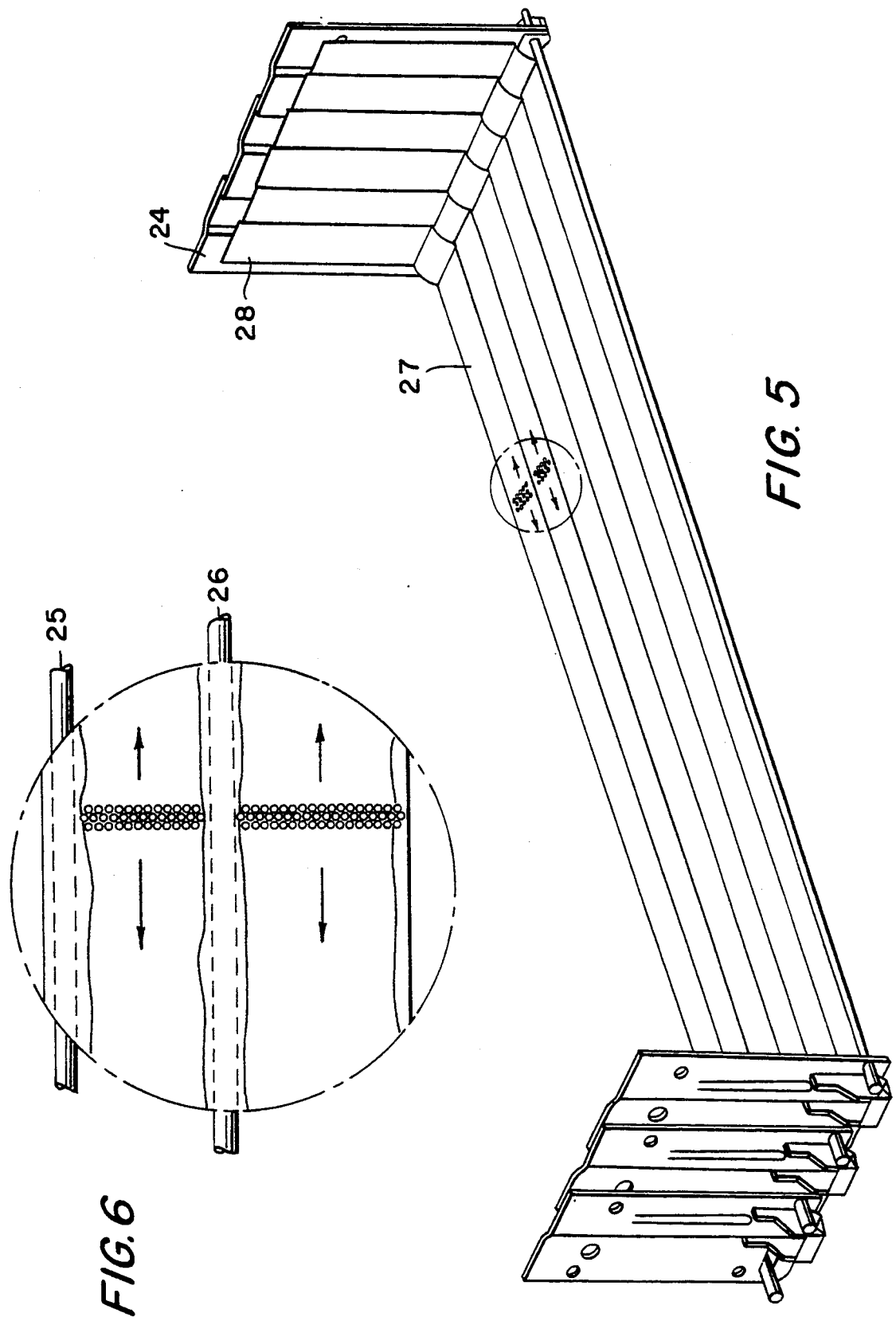

CONVEYOR BELT FOR TREATMENT OF PARTICULATE SOLID MATERIAL

BACKGROUND OF THE INVENTION

This invention is an improved endless conveyor belt that can be used to reorder or dry tobacco, or treat other particulate solid materials. The improvement comprises modification to a self-stacking spiral conveyor belt that traverses through a circulating treatment gas in the housing of a gas treatment apparatus. The modification allows treatment of much smaller-dimension discrete products than had been possible with open-web belts of the prior art. The modification also makes it possible to treat a packed bed of conveyed product rather than a single layer of relatively large discrete products. The invention also provides additional control over the gas flow within the gas treatment apparatus. These objectives are achieved without impairing the articulation of the belt links into the spiral. Prior art conveyor belts of this type are either self-stacking, i.e., the side links are in the form of side plates serving as spacers, the upper edge portions of which are adapted to engage the lower edge portions of the overlying turn of the conveyor belt so as to support this turn, or supported by separate rails following the spiral path of the conveyor belt.

A gas treatment apparatus in the form of a self-stacking spiral conveyor is known where products on the conveyor are treated by heat transfer from a treatment gas, such as refrigerating, freezing, or heating. The conditioning means for the treatment gas may be a heat exchanger which cools or heats the treatment gas before it circulates around and through the bed of conveyed product.

For example, a Frigoscandia self-stacking spiral conveying machine (e.g., a Model GCP 42 self-stacking spiral freezer supplied by Frigoscandia Food Process Systems AB of Helsingborg, Sweden) is disclosed in U.S. Pat. Nos. 3,938,651, 4,565,282, 4,603,776, 4,899,871, and No. 4,941,567. This apparatus, by virtue of its self-stacking spiral design and gas recirculation fans, channels the majority of gas flow downward through the multiple tiers of the conveyor, which are carrying the product.

Use of the appropriate treatment agent in the treatment gas permits a variety of non-thermal treatments to the conveyed product. The use of such a device for non-thermal treatments such as a process where air of controlled moisture content is used to increase the moisture content of tobacco is disclosed in copending, commonly-assigned U.S. patent applications Ser. Nos. 07/969,109 and 07/969,798, filed concurrently herewith and hereby incorporated by reference in their entireties.

The use of such a gas treatment apparatus has heretofore been limited by the open web of the conveyor belt to relatively large discrete solid objects such as hamburger patties. The prior art open-web belt used a series of interlocking flattened helical springs to prevent the conveyed material from falling through the gaps between the rods that supported the conveyor belt bottom. These rods and springs formed an open-web belt that was not adaptable for use with small or irregularly sized products such as cut tobacco leaves.

Additionally, the resistance to gas flow from the rods and springs was very low and essentially invariable. The fixed resistance to gas flow precluded varying the resistance to gas flow in the vertical direction as one tool to control the gas flow pattern within the conveyor stack.

SUMMARY OF THE INVENTION

It is therefore an object of this invention to provide a conveyor belt that may be configured to carry minute particles such as are found in packed bed applications.

It is also an object of this invention to provide a means to form a trough within the conveyor belt so that packed beds or other conveyed products may be placed within the confines of the trough and not contact the sides of the conveyor belt.

It is a further object of this invention to provide control over the total resistance of the conveyor belt to gas flow in the vertical direction within the conveyor stack.

It is a still further object of this invention to provide control over the relative resistance of various zones on each conveyor belt tier.

It is an even further object of this invention to provide a means to achieve the above mentioned objectives without impeding the radial and vertical articulation of the endless conveyor belt.

These and other objects are met by a gas-treatment apparatus which comprises a housing having an infeed and an outfeed. An endless conveyor belt runs through the infeed into the housing, follows a spiral path comprising several superimposed tiers in the housing, and runs through the outfeed opening of the housing. The conveyor belt has links that are relatively moveable, enabling the conveyor belt to follow a predetermined path, with each link having a fixed rod and an articulation rod and a spacer member at each transverse side of the conveyor belt for supporting the conveyor belt in an overlying tier. The two rods are attached to the side spacers. The articulation rod is also attached to the adjacent conveyor link's spacer members with one end attached through a hole in the spacer member and with one end of the articulation rod free to slide in a slot in the adjacent conveyor link's other side spacer. A foraminous bottom member extends along a portion of the width of the conveyor link, preferably the foraminous bottom member extends along nearly the whole transverse width of the conveyor link, and is attached to both rods. Each foraminous bottom member may and preferably does overlap an adjacent foraminous bottom member. However, such overlap should not impair the belt links from articulating. The endless conveyor belt in its spiral path forms a conveyor stack in the form of hollow cylinder having a perforated inner wall and a perforated outer wall comprising the spacing members and defining a vertical tube bounded by the spacing members comprising the inner wall of the hollow cylinder.

The perforations in the foraminous bottom members are dimensioned according to the size of the particles to be transported, and the number of perforations are chosen according to the gas flow desired to pass through the perforated bottom members. The perforations in the bottom member may be of one or more shapes and may be arranged in a regular or an irregular pattern. Optionally, the region of the foraminous bottom member overlaps the adjacent foraminous bottom member and the region of the adjacent foraminous bottom member that is overlapped by the first bottom member may be given more perforations so as to decrease the resistance to gas flow in these zones of overlap. Optionally, the regions of the foraminous bottom member immediately above the fixed rods may be perforation-free to increase the strength of the foraminous bottom member or to merely reduce the manufacturing cost for perforations. Optionally, bends used to form the foraminous bottom member may be replaced with creases to increase the rigidity of the foraminous bottom member.

Advantageously, each foraminous bottom member may at its side ends have upstanding flanges overlapping the upstanding flanges of an adjacent foraminous bottom member in the same manner as the foraminous bottom members themselves overlap. The flanges may also be perforated to increase gas flow in the radial direction. As a result of the flanges, the conveyor belt will be formed like a trough enabling transport of very minute particles such as are found in packed bed applications. Another application of upstanding flanges is to act as an impediment to gas flow along the longitudinal direction of the endless conveyor belt so as to increase gas flow in other directions such as in the vertical direction through the packed bed of conveyed product. In order to reduce flow along the longitudinal direction, i.e., the spiral flow for a self-stacking conveyor stack, the upstanding flanges would be attached at least partially transverse to the direction of belt travel.

BRIEF DESCRIPTION OF THE DRAWINGS

Other objects and advantages of the present invention will become apparent to one skilled in the art upon reading the following detailed description with the accompanying drawings, in which like reference characters refer to like parts throughout, and where:

FIG. 3 is a detail drawing showing another embodiment of the foraminous bottom member;

FIG. 4 is a cross section of FIG. 3;

FIG. 5 is a detail drawing with an enlarged view of a preferred embodiment perforation pattern; and FIG. 6 is a detail of FIG. 5.

DESCRIPTION OF THE PREFERRED EMBODIMENT

Figure 1:
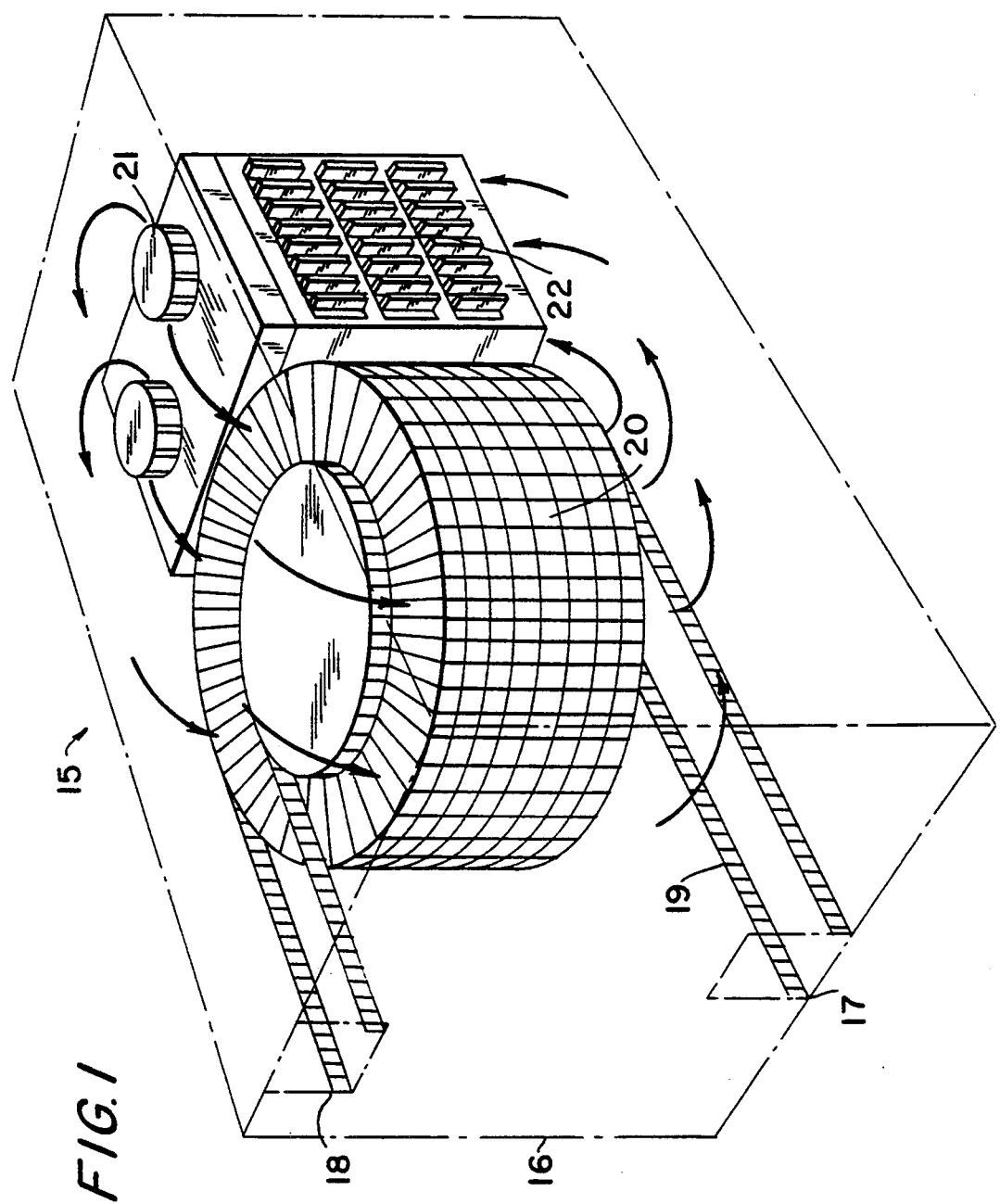
FIG. 1 is a perspective view of one gas-treatment apparatus in which the present invention is applicable.

The gas-treatment apparatus 15, shown generally in FIG. 1, comprises a housing 16 having an infeed opening 17 and an outfeed opening 18. An endless conveyor belt 19 runs through the infeed opening 17 into the housing 16. In the housing 16, the endless conveyor belt 19 follows along at least a portion of its length a spiral path comprising several superimposed tiers to form a conveyor stack 20. The endless conveyor belt 19 then exits the housing 16 through the outfeed opening 18. After exiting, the endless conveyor belt 19 returns to the infeed opening 17. The return is not shown, but could occur inside or outside of the housing. FIG. 1 also shows the gas flow pattern from the fan 21, down through the conveyor stack 20, and back through the conditioning means 22, before returning to the fan 21. The endless conveyor belt 19 is of the self-supporting type and consists of a plurality of conveyor links 23 shown in FIG. 2. The conveyor links 23 are mutually moveable in such a way that the belt can follow the path illustrated in FIG. 1. More precisely, each conveyor link 23 of the conveyor belt 19 comprises two spacer members 24, one at each side of two rods 25 and 26. The fixed rod 25 is fixedly attached at both spacer members 24, and the articulation rod 26 fixedly connected to both spacer members 24, and also connected to the adjacent conveyor link's spacer members 24, at one adjacent spacer member by a hole and at the other adjacent spacer member by a slot. Exemplifying embodiments of the conveyor belt 19 that may be used in the apparatus according to the present invention are disclosed in e.g., U.S. Pat. Nos. 3,938,651, 4,603,776 and 4,941,567, all assigned to Frigoscandia Contracting AB of Sweden and incorporated herein by reference.

FIGS. 3 and 4 give additional detail of a single foraminous bottom member 27 through which the air flow may pass. Each foraminous bottom member 27 is spot welded or otherwise fixedly attached to both rods 25 and 26 and fits between the two spacer members 24. The leading edge of the foraminous bottom member may be curled downward to wrap around a portion of the circumference of the articulation rod 25. The trailing edge of each foraminous bottom members 27 may overlap the curved leading edge of the successive foraminous bottom member 27 and is shaped so as to allow the endless conveyor belt 19 to freely articulate into the conveyor stack 20. The term articulate is defined as bending or other relative motion at jointed, slotted or other types of connections. Thus, the foraminous bottom members 27 will overlap substantially in the same manner as the side spacers 24.

A plenum zone 29 is formed by the trailing ridge 30 of the foraminous bottom member 27 as the one foraminous bottom member overlaps the successive foraminous bottom member. This plenum zone 29 allows gas to flow through perforations in the overlapping region of the foraminous bottom member 27 and then through the perforations in the overlapped region of the successive foraminous bottom member 27 or through the gap between the overlapping and overlapped foraminous bottom members 27.

Figure 2:
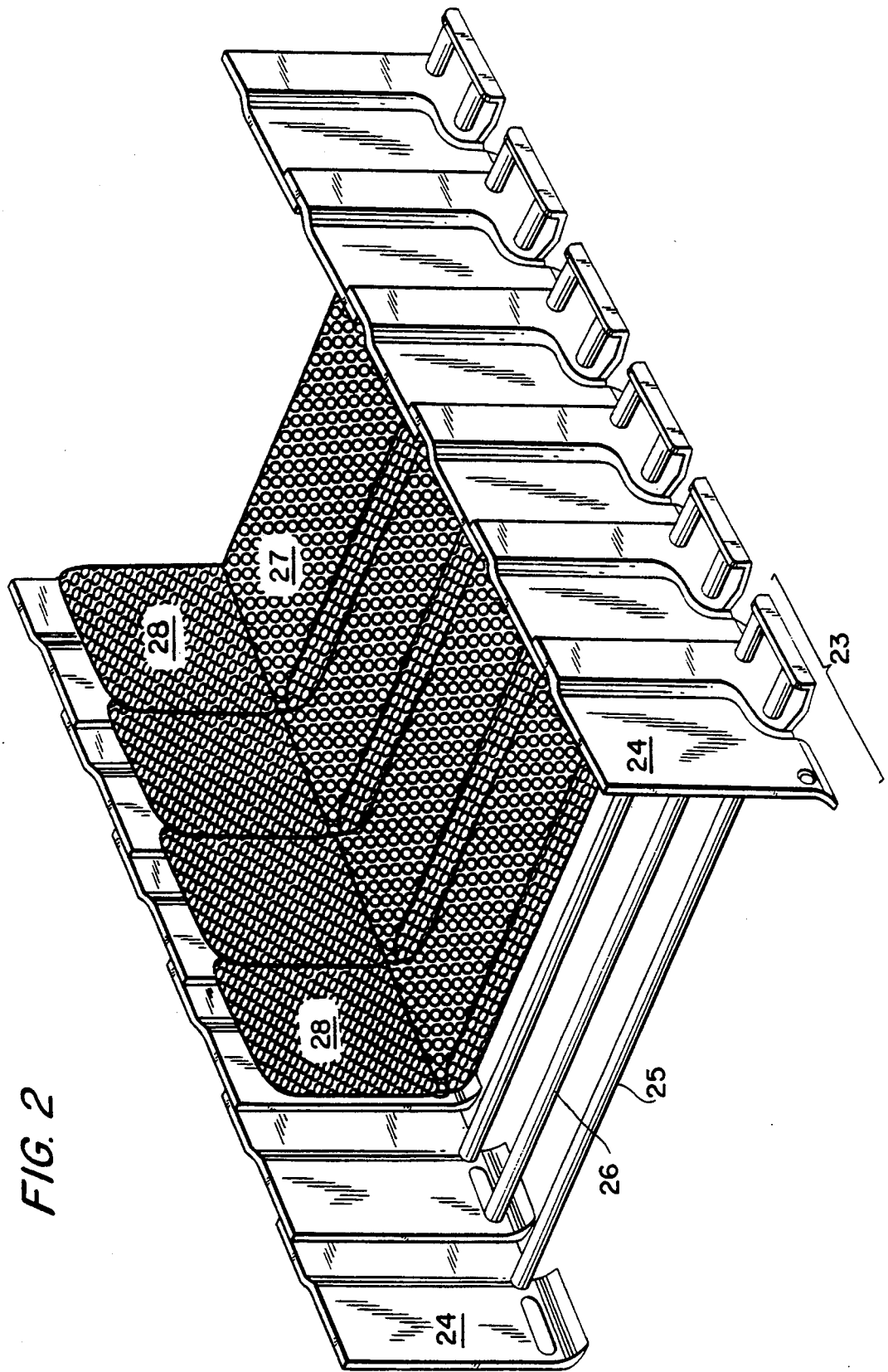
FIG. 2 is a detail drawing showing the endless conveyor belt and one embodiment of the foraminous bottom member.

The foraminous bottom member 27 is illustrated in FIGS. 2 and 3 with the optional flanges 28, which are particularly useful when the conveyed material is a packed bed or otherwise likely to contact and potentially impede the articulation of the side spacers.

The foraminous bottom member 27 does not necessarily extend the full distance between spacers members 24 and is not necessarily attached to either spacer members 24, however, for additional strength, the foraminous bottom member 27 may be sized so that the leading edge of the foraminous bottom member 27 is approximately the size of the gap between spacer members 24 and the foraminous bottom member could be attached to the spacer members 24. The flanges 28 may be bent inward at the trailing edge so the that the flanges overlap and do not impede the motion of the articulating conveyor links. The height of the flanges 28 is less than the height of the side spacers 24 so that the overlapping portion of the flanges 28 does not extend beyond the height of side spacers 24 while both the foraminous bottom members 27 and the side spacers 24 are bending in the vertical plane.

The foraminous bottom member 27 is designed to allow adequate gas flow while retaining the conveyed material. FIG. 2 shows one embodiment of the foraminous bottom member made from standard punch plate and carefully bent into the appropriate shape. FIGS. 5 and 6 illustrate another embodiment of the foraminous bottom member 27 with side flanges 28. For example, the foraminous bottom member 27 may be punched with one millimeter diameter holes densely packed in a triangular pattern with 1.7 millimeter centers. FIG. 6 shows a sample of the hole pattern with arrows to indicate that the holes would be added along the entire transverse length of the foraminous bottom member 27. For added strength of the foraminous bottom member 27, the holes are not added in the portion of the bottom member above the rods 25 and 26.

Gas flow in the region above the rods 25 and 26 could be increased by one of several methods, including drilling holes through the rods, or placing a thick weld or other spacer to raise the foraminous bottom member 27 above the rods 25 and 26 so as to make perforations of the foraminous bottom member 27 effective above the rods 25 and 26. Alternatively, the density of perforations may be increased in the foraminous bottom members adjacent to the zones above the rods 25 and 26.

The foraminous bottom members 27 are perforated such that the conveyor belt may transport particles of a minute size. Thus, the widths of the perforations are dimensioned according to the size of the particles to be transported, and the number of perforations are chosen according to the air flow desired to pass through the bottom plates. The combination of perforation size and perforation density gives considerable latitude in the resistance of the foraminous bottom member 27 to gas flow in the vertical direction. Slots or other non-circular shapes could be substituted for holes if the alternative shape provided an advantage in retaining conveyed material for a given application or if these shapes allowed reduced fabrication costs.

It is known in the art that the treatment gas in a packed bed application is more uniformly distributed when the resistance to gas flow of the structure supporting the packed bed is a significant fraction of the resistance of the packed bed to gas flow. Thus, the ability to modify the gas flow resistance is important for a packed bed application. Additionally, the bottom plates may be perforated with various perforation sizes or perforation densities or perforation patterns to influence gas flow patterns. For example, progressively larger holes and or progressively denser hole patterns could be used across the transverse dimension of the foraminous bottom member to bias the gas flow to the portion of the foraminous bottom member on the inner radius of the conveyor stack. This biasing of gas flow could be employed to equalize the treatment of a packed bed of conveyed product since the depth of the packed bed increases across the transverse dimension of the foraminous bottom member proportionately to the amount of overlap along the foraminous bottom member as the conveyor belt articulates into a circle if the feed is uniformly distributed on the straight inlet section. Alternatively, the feed of conveyed material could be biased so that the depth of the conveyed material bed is essentially uniform after the belt articulates. Also, the flanges may be perforated to increase radial flow.

As illustrated in FIGS. 3 and 4, creases 31–36 may be added to the bent foraminous bottom members 27 and associated upright flanges 28 as a means for increasing the rigidity of the foraminous bottom members.

The term spiral should be read broadly and not limited to a circular spiral. The invention is equally applicable to oval spirals, spirals with relatively large segments of straight conveyor belt so that the spiral is essentially in the shape of an ellipse, a triangle, rectangle, pentagon, or other polygon, a double spiral where the endless conveyor belt articulates in first one direction then in the opposite direction, and to any other shape that requires the conveyor belt to both ascend and curve, or to descend and curve, such as overlaid figure eights, and spirals with successive tiers that are either progressively smaller or progressively larger than the preceding tiers. A figure eight would require the conveyor belt to bend to both the right and to the left, but the present invention would be applicable to such a conveyor belt as well. The present invention could be applied generally to any conveying system that bends into curves and changes elevation. The use for such a belt could be unrelated to any gas treatment apparatus, for example, assembly lines, food processing conveyors, inspection conveyors, or select and convey operations from warehouses.

The perforation openings in the foraminous bottom members could be of any shape that allows the passage of gas through the foraminous bottom member, including round openings, slit openings, polygonal openings, irregular shaped openings, and opening that have a change in shape or size from the top surface of the foraminous bottom member to the bottom surface of the foraminous bottom member.

One skilled in the art will appreciate that the present invention can be practiced by other than the described embodiments, which are presented for purposes of illustration and not of limitation.

We claim:

1. An endless conveyor belt comprised of a plurality of conveyor links which articulate in such a manner that the endless conveyor belt can follow a predetermined path, each conveyor link comprising:
   (a) two spacer members substantially perpendicular to the plane formed by the conveyor belt;
   (b) a fixed rod fixedly connected to both spacer members;
   (c) an articulation rod fixedly connected to both spacer members;
   (d) a foraminous bottom member which is fixedly attached to either the fixed rod or the articulation rod or both, the foraminous bottom member extending along a portion of the width of the endless conveyor belt link in a direction transverse to belt travel, and shaped such that the foraminous bottom member does not impede the conveyor belt's articulation; wherein the articulation rod of each conveyor link is connected to an adjacent conveyor link's spacer members, wherein an upstanding flange is attached to one or more ends of each foraminous bottom members wherein the flanges are shaped such that the flanges do not impede the conveyor belt's articulation.

2. The endless conveyor belt of claim 1, wherein the endless conveyor belt is self supporting.

3. The endless conveyor belt of claim 1, wherein a portion of the predetermined path is a spiral.

4. The endless conveyor belt of claim 1, wherein a portion of the predetermined path is a self-stacking spiral.

5. The endless conveyor belt of claim 1, wherein the foraminous bottom member is of sufficient length in a direction parallel to conveyor belt travel to at least partially overlap an adjacent foraminous bottom member.

6. The endless conveyor belt of claim 1, wherein the foraminous bottom member has a ridge in the portion of the foraminous bottom member that overlaps the adjacent bottom member forming a plenum zone which facilitates gas flow through overlapping and overlapped areas of the foraminous bottom members.

7. The endless conveyor belt of claim 1, wherein the dimensions of the perforations or the number of perforations, or both are varied across the foraminous bottom member to influence gas flow.

8. The endless conveyor belt of claim 5, wherein said bottom member includes a trailing edge portion, said trailing edge portion at least partially overlapping an adjacent foraminous bottom member.

9. The endless conveyor belt of claim 1, wherein the flanges are perforated.

10. The endless conveyor belt of claim 1, wherein the endless conveyor belt carries a conveyed product through a gas treatment apparatus in which the conveyed product is exposed to a treatment gas and where the foraminous bottom member is constructed with the dimensions of the perforations, the number of perforations, or both varied across the foraminous bottom member to bias the flow of treatment gas.

11. A conveyor belt comprised of a plurality of endless conveyor belt links which articulate in such a manner that the endless conveyor belt links which articulate in such a manner that the endless conveyor belt can follow a spiral path along a portion of a predetermined path, the endless conveyor link comprising:

(a) two spacer members substantially perpendicular to the plane formed by the conveyor belt;

(b) a fixed rod fixedly connected to both spacer members;

(c) an articulation rod fixedly connected to both spacer members;

(d) a foraminous bottom member fixedly attached to either or both the fixed rod and the articulation rod, the foraminous bottom member extending along a portion of the transverse width of the conveyor link; wherein the articulation rod of each endless conveyor belt link is connected to an adjacent endless conveyor belt link's spacer members and the foraminous bottom member is of sufficient length in the direction of conveyor belt travel to partially overlap an adjacent foraminous bottom member, and is shaped such that the foraminous bottom member does not impede the endless conveyor belt's radial articulation or vertical articulation, wherein each foraminous bottom member has at least one upstanding flange at one or more ends of the foraminous bottom member, wherein the flange of a foraminous bottom member overlaps the flanges of an adjacent foraminous bottom member in the same manner as the foraminous bottom members overlap, and wherein the flanges are shaped such that the flanges do not impede the conveyor belt's radial articulation or vertical articulation.

12. The endless conveyor belt of claim 11, wherein the perforations in the foraminous bottom members are dimensioned to hold the particles to be transported, and the number of perforations is chosen according to the desired gas flow through the foraminous bottom member.

13. The endless conveyor belt of claim 11, wherein the upstanding flange is attached to one or both longitudinal ends of each foraminous bottom member in such a manner that the flange reduces the flow of conveyed material or gas flow in the longitudinal direction.

14. The endless conveyor belt of claim 11, wherein the upstanding flange is attached to one or both transverse ends of each foraminous bottom member.

15. The endless conveyor belt of claim 11, wherein the endless conveyor belt is self supporting.

16. The endless conveyor belt of claim 11, wherein the flanges of the foraminous bottom members are perforated to increase radial gas flow.

17. The endless conveyor belt of claim 11, wherein the flanges of a foraminous bottom member overlap the flanges of an adjacent foraminous bottom member in the same manner as the foraminous bottom members overlap.

18. The endless conveyor belt of claim 11, wherein a portion of the predetermined path is a spiral.

19. The endless conveyor belt of claim 11, wherein said bottom member includes a trailing edge portion, said trailing edge portion at least partially overlapping an adjacent foraminous bottom member.

20. An endless conveyor belt comprised of a plurality of conveyor links which articulate in such a manner that the endless conveyor belt can follow a predetermined path, each conveyor link comprising:

(a) two spacer members substantially perpendicular to the plan formed by the conveyor belt;

(b) a fixed rod fixedly connected to both spacer members;

(c) an articulation rod fixedly connected to both spacer members;

(d) a bottom member which is fixedly attached to either the fixed rod or the articulation rod or both, the bottom member extending along a portion of the width of the conveyor link, and shaped such that the bottom member does not impede the conveyor belt's articulation; wherein the articulation rod of each conveyor link is connected to an adjacent conveyor link's spacer members, wherein an upstanding flange is attached to one or more ends of each bottom member in such a manner that the flanges are shaped such that the flanges do not impede the conveyor belts' articulation.

21. The endless conveyor belt of claim 20, wherein the bottom members are of sufficient length in the direction of conveyor belt travel to at least partially overlap an adjacent foraminous bottom member.

22. The endless conveyor belt of claim 20 wherein the bottom member is fixedly attached to the side spacers and said attachment does not impede the conveyor belts articulation.

* * * * *